Nov. 23, 1926.
K. BJÖRHUUS
DIRIGIBLE HEADLIGHT
Filed Feb. 4, 1926
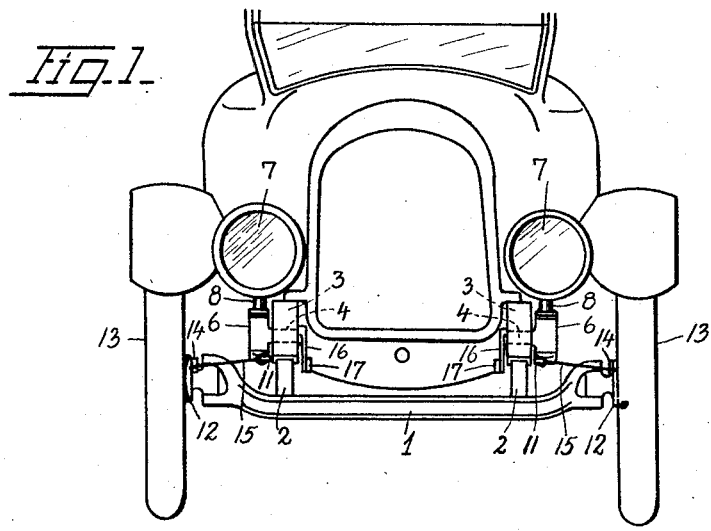
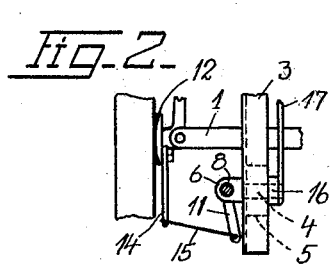
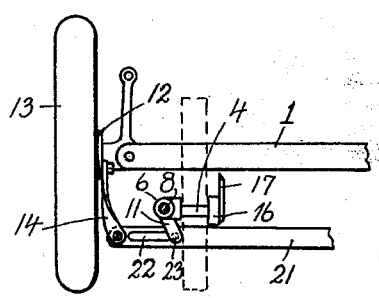
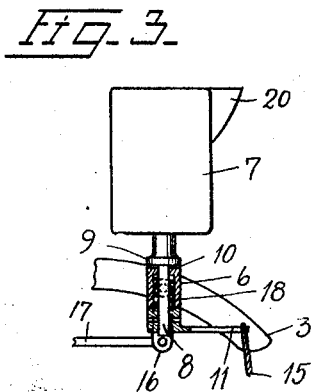
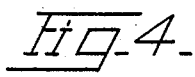
Inventor:
Knut Björhuus Patented Nov. 23, 1926.

1,607,719

UNITED STATES PATENT OFFICE.

KNUT BJÖRHUUS, OF OSTRE AKER, NEAR OSLO, NORWAY.

DIRIGIBLE HEADLIGHT.

Application filed February 4, 1926, Serial No. 85,983, and in Norway December 10, 1924.

The invention relates to dirigible headlight mechanisms for motor driven vehicles, and has for its object to provide means whereby the headlight on one of the sides only of the vehicle will be turned, automatically, during the steering operation of the vehicle, the said means also allowing simultaneous tilting movement of both headlights if desired.

In the drawing:

Fig. 1 is a front view of an automobile having the invention applied thereto.

Fig. 2 is a top view in detail of the steering mechanism of one front wheel and of the connection therefrom to the stem or pivot of the corresponding headlight.

Fig. 3 is a side view of one headlight, the mounting arrangement being shown in section.

Fig. 4 is a top view of a modified form of connection between the wheel steering mechanism and the corresponding headlight.

The front axle 1 is connected to the frame by means of the springs 2 and the channel-iron side bars 3. In each of the said channel irons is horizontally mounted a rotatable shaft or stud 4, the channel iron being, for this purpose, filled at the desired point by the insertion of a suitable block 5 (Fig. 2) or the like, which receives the said stud. The stud 4 carries at the outer side of the iron 3 a normally vertically disposed sleeve 6 in which is journalled the stem or pivot 8 of the headlight 7. This stem rests upon the sleeve 6 by means of a flange 9 provided on the stem, a washer 10 of rubber or other suitable material being preferably interposed between the said flange and the sleeve in order to take up shocks. To the lower end of the stem 8 is secured an arm 11 which normally, when the headlight 7 is in normal position, projecting the light straight forward, rests against the outer side surface of the channel iron 3, or against some other abutment provided for this purpose. Within the sleeve 6 is provided a torsion spring 18, which acts upon the stem 8 in such manner that the arm 11 is normally pressed against the said abutment and the headlight thereby held in normal position.

To the flange 12 on the hub of the front wheel 13, or to another movable part of the steering mechanism, is secured an arm 14 which through some flexible means, for instance a wire 15, as shown, is connected to the free end of the arm 11.

To the inner end of the horizontal stud 4 is secured a normally vertical arm 16 which, by means of a connecting rod 17 or other suitable device, is connected to a lever (not shown) placed for easy access near the driver's seat. The arms 16 of both headlights are thus connected to the said lever so that they may be tilted simultaneously.

When the driver turns the steering wheel so as to cause the automobile to turn, say to the left, the left hand headlight 7 will, through the arm 14 and the wire 15 and the arm 11, be caused to turn to the left against the action of the spring 18, whereas the right hand headlight remains in its normal position, as the flexible connecting member 15 does not impart any movement thereto. When the front wheels are again turned to normal position the left hand headlight will also be turned to normal position by means of the spring 18, the arm 11 limiting this movement by abutting against the channel iron 3.

When it is desired to tilt the headlights, for instance, when another vehicle is encountered on the highway, the driver makes use of the previously-mentioned lever. Through the members 17 and 16 the studs 4 are then turned in their bearings so that both headlights are tilted.

It will be seen that the described arrangement allows for simultaneous turning and tilting of the headlights, and thus it will never become necessary to turn off the light.

Fig. 4 shows a modified arrangement for the turning of the headlights. The arms 14 are secured to a cross bar 21 which at each end is provided with a slot 22 adapted to receive a stud 23 on the arm 11. The said slots are so shaped and placed that when the wheels 13 are in middle position and both headlights are projecting light straight forward, the studs 23 will abut against the inner ends of the corresponding slots. When the front wheels are turned, say to the left, the left stud 23 will be moved correspondingly and turn the left headlight, whereas the right stud 23 will be free to slide in its slot.

The headlights proper may also be connected with their turning studs in such manner that they may be tilted forwardly relatively thereto, the sleeve 6 not making any tilting movement.

Having now particularly described and ascertained the nature of my said invention, and in what manner the same is to be performed, I declare that what I claim is:

1. Dirigible headlight mechanism for motor vehicles, comprising a pair of sleeves provided with lateral supporting studs adapted to be rotatably mounted in the side bars of the chassis of a vehicle to enable tilting of the sleeves about horizontal axes; a pair of lamps having their stems rotatably fitting in said sleeves; a lateral arm secured to each lamp stem; an arm rigidly attached to the hub of each front wheel of the vehicle; connecting means between each wheel-carried arm and the adjacent lamp stem arm to cause the steering movement of said front wheels in either direction to be transmitted solely to one lamp stem arm and its associated lamp to rotate the same, to the exclusion of the other arm and lamp; and means connected to said studs to tilt the associated sleeves and lamps independently of their rotating movement.

2. Dirigible headlight mechanism for motor vehicles, comprising a pair of sleeves provided with lateral studs adapted to be rotatably mounted in the side bars of the chassis of a vehicle to enable tilting of the sleeves about horizontal axes; a pair of lamps having their stems rotatably fitting in said sleeves; a lateral arm secured to each lamp stem; an arm rigidly attached to the hub of each front wheel of the vehicle; a flexible member connecting each wheel-carried arm to the adjacent lamp stem arm to cause the steering movement of said front wheels in either direction to exert a direct actuating pull on solely one flexible member and its associatd lamp to rotate the latter, to the exclusion of the other flexible member and lamp; and means connected to said studs to tilt the associated sleeves and lamps independently of their rotating movement.

In testimony whereof I affix my signature.

KNUT BJÖRHUUS.